United States Patent
Evans et al.

(10) Patent No.: US 7,400,384 B1
(45) Date of Patent: Jul. 15, 2008

(54) METHOD AND APPARATUS FOR VARYING PIXEL SPATIAL RESOLUTION FOR LADAR SYSTEMS

(75) Inventors: Bruno J. Evans, Keller, TX (US); W. Dale Cotten, Grand Prairie, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 57 days.

(21) Appl. No.: 11/279,332

(22) Filed: Apr. 11, 2006

Related U.S. Application Data

(60) Provisional application No. 60/670,333, filed on Apr. 12, 2005.

(51) Int. Cl.
 *G01C 3/08* (2006.01)
(52) U.S. Cl. .................................................. 356/5.01
(58) Field of Classification Search .................. 356/5.01
 See application file for complete search history.

(56) References Cited

U.S. PATENT DOCUMENTS

| | | | |
|---|---|---|---|
| 5,345,304 A * | 9/1994 | Allen | 356/5.01 |
| 6,865,034 B1 * | 3/2005 | Willis | 359/820 |
| 2002/0109829 A1 * | 8/2002 | Hayes | 356/4.01 |
| 2003/0137645 A1 * | 7/2003 | Fluckiger | 356/4.01 |

* cited by examiner

*Primary Examiner*—Thomas H. Tarcza
*Assistant Examiner*—Luke D Ratcliffe
(74) *Attorney, Agent, or Firm*—Williams, Morgan & Amerson, P.C.

(57) ABSTRACT

A LADAR apparatus, a method of use associated therewith, and a method for remotely sensing targets in a field of view are disclosed. In the method, a target in a field of view is remotely sensed using a LADAR signal whose pixel spatial resolution is varied to achieve a desired pixel spatial resolution for the transmitted LADAR signal on the target. One way to do this is by rolling a LADAR signal to achieve the desired pixel spatial resolution at a given range then de-rolling the received reflection. This could involve, for instance, rolling the LADAR signal from a first angle at which it is generated to a second angle at which it is transmitted, and then receiving the reflection at that second angle and de-rolling it to the first angle again for detection. The LADAR apparatus could include a number of means for implementing this functionality. One particular apparatus that is suitable includes a LADAR signal transmitter; a transmission path; a receive path; a receiver; and an optical roll/de-roll mechanism. The optical roll/de-roll mechanism is capable of rolling the LADAR signal before transmission to achieve a desired pixel spatial resolution for the transmitted LADAR signal at a given range and de-rolling the reflection prior to detection.

62 Claims, 10 Drawing Sheets

METHOD AND APPARATUS FOR VARYING PIXEL SPATIAL RESOLUTION FOR LADAR SYSTEMS

We claim the benefit of the earlier effective filing date of co-pending U.S. Provisional Application Ser. No. 60/670,333, entitled METHOD AND APPARATUS FOR VARYING PIXEL SPATIAL RESOLUTION FOR LADAR SYSTEMS" filed Apr. 12, 2005, in the name of the inventors Bruno J. Evans and W. Dale Cotton, which is hereby incorporated by reference for all purposes as if expressly set forth verbatim herein.

BACKGROUND OF THE INVENTION

1. Field of the Invention

The present invention pertains to Laser Detection and Ranging ("LADAR") systems, and, more particularly, to linear array LADAR systems.

2. Description of the Related Art

A need of great importance in military and some civilian operations is the ability to quickly detect and identify objects, frequently referred to as "targets," in a "field of view." A common problem in military operations, for example, is to detect and identify targets, such as tanks, vehicles, guns, and similar items, which have been camouflaged or which are operating at night or in foggy weather. It is important in many instances to be able to distinguish reliably between enemy and friendly forces. As the pace of battlefield operations increases, so does the need for quick and accurate identification of potential targets as friend or foe, and as a target or not.

Techniques for identifying targets have existed for many years. For instance, in World War II, the British developed and utilized radio detection and ranging ("RADAR") systems for identifying the incoming planes of the German Luftwaffe. RADAR uses radio waves to locate objects at great distances even in bad weather or in total darkness. Sound navigation and ranging ("SONAR") has found similar utility and application in environments where signals propagate through water, as opposed to the atmosphere. While RADAR and SONAR have proven quite effective in many areas, they are inherently limited by a number of factors. For instance, RADAR is limited because of its use of radio frequency signals and the size of the resultant antennas used to transmit and receive such signals. Sonar suffers similar types of limitations. Thus, alternative technologies have been developed and deployed.

One such alternative technology is laser detection and ranging ("LADAR"). Similar to RADAR systems, which transmit and receive radio waves to and reflected from objects, LADAR systems transmit laser beams and receive reflections from targets. Because of the short wavelengths associated with laser beam transmissions, LADAR data exhibits much greater resolution than RADAR data. Typically, a LADAR system creates a three-dimensional ("3-D") image. The reflected LADAR signal provides an (x,y) coordinate for the point that reflected the signal. The time of flight of the LADAR signal (i.e., the time lapse between the transmission of the LADAR signal and the receipt of its reflection) is used to determine the range to the point of reflection, which provides a z-axis coordinate. Each datum comprising an (x,y) coordinate and associated range is referred to as a "pixel."

The pixel resolution is a function of their spacing, and is fixed by the optical system and/or, for scanned systems, the scan rate. Many LADAR systems require a nominal pixel spacing to maintain automatic target recognition ("ATR") performance. In fact, for greater ATR performance, it is desired that the pixel spacing remained fixed over the system's range capabilities. Thus, for a fixed pixel spacing, the LADAR system's ATR performance is a function of the LADAR system's range. For systems where the minimum and maximum ranges differ by one, two, or more orders of magnitude, this requires the sensor to optically change the field of view ("FOV") to meet the challenge of maintaining a fixed pixel spacing. For instance, To date, the problem has been solved in several ways, including:

(i) optical FOV changes;
(ii) interlacing returns to give two effective FOVs, as is disclosed in U.S. Pat. No. 5,898,483, entitled "Method for increasing LADAR resolution", issued Apr. 27, 1999, to Lockheed Martin Corp. as assignee of the inventor E. Max Flowers, and commonly assigned herewith; and
(iii) a staggered linear array to give two FOVs, as is done in Polarimetric Imaging Laser Radar ("PILAR") on various unmanned aerial vehicles ("UAVs") deployed by the United States military services.

Thus, multiple detector imaging sensors have fixed detectors. With fixed detectors, multiple FOV optics (or zoom lens) are required to maintain image resolution (spatial pixel spacing) at different ranges. LADAR sensors are no different. In fact, multiple beam/detector LADAR sensors are even more difficult to design with variable pixel spacing due to the transmitter receiver alignment for each required FOV.

The present invention is directed to resolving, or at least reducing, one or all of the problems mentioned above.

SUMMARY OF THE INVENTION

The invention includes a LADAR apparatus, a method of use associated therewith, and a method for remotely sensing targets in a field of view are disclosed.

In a first embodiment of the present invention, a LADAR apparatus comprises a LADAR signal transmitter; a transmission path through which a LADAR signal may be transmitted from the LADAR signal transmitter; a receive path through which a reflection of the transmitted LADAR signal may be received; a receiver capable of receiving the reflection through the transmission path; and an optical roll/de-roll mechanism capable of rolling the LADAR signal before transmission to achieve a desired pixel spatial resolution for the transmitted LADAR signal at a given range and de-rolling the reflection prior to detection.

In a second embodiment, a method comprises generating a LADAR signal; rolling the generated LADAR signal to achieve a desired pixel spatial resolution at a given range; transmitting the rolled LADAR signal into a field of view; receiving a reflection of the transmitted LADAR signal; and de-rolling the received reflection.

In a third alternative embodiment, a method, comprises transmitting a LADAR signal at a first angle; rolling the transmitted LADAR signal to a second angle to achieve a desired pixel spatial resolution for the transmitted LADAR signal at a given range; receiving a reflection of the transmitted LADAR signal at the second angle; and de-rolling the reflection to the first angle prior to detection.

In a fourth alternative embodiment, a method comprises remotely sensing a target in a field of view using a LADAR signal; and varying the pixel spatial resolution of the LADAR signal to achieve a desired pixel spatial resolution for the transmitted LADAR signal on the target.

In still other embodiments, various apparatus comprises means for performing the functionality of the recited methods.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
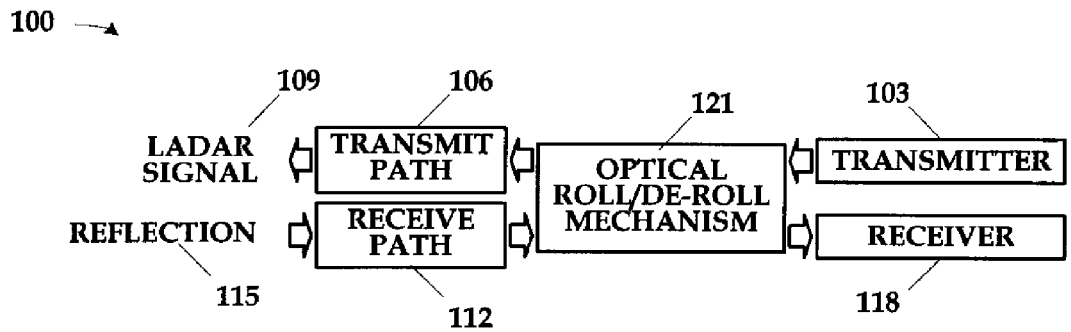
FIG. 1 is a block diagram of a LADAR apparatus in accordance with the present invention.

Turning now to the drawings, FIG. 1 is a block diagram of a LADAR apparatus 100 in accordance with the present invention. The LADAR apparatus 100 comprises a LADAR signal transmitter 103 and a transmit path 106 through which a LADAR signal 109 may be transmitted from the LADAR signal transmitter 103. The LADAR apparatus 100 also comprises a receive path 112 through which a reflection 115 of the transmitted LADAR signal 109 may be received and a receiver 118 capable of receiving the reflection through the receive path 112. The LADAR apparatus 100 furthermore comprises an optical roll/de-roll mechanism 121 in the transmit and receive paths 106 capable of rolling the LADAR signal 109 before transmission to achieve a desired pixel spatial resolution for the transmitted LADAR signal at a given range and de-rolling the reflection prior to detection.

Figure 2A:
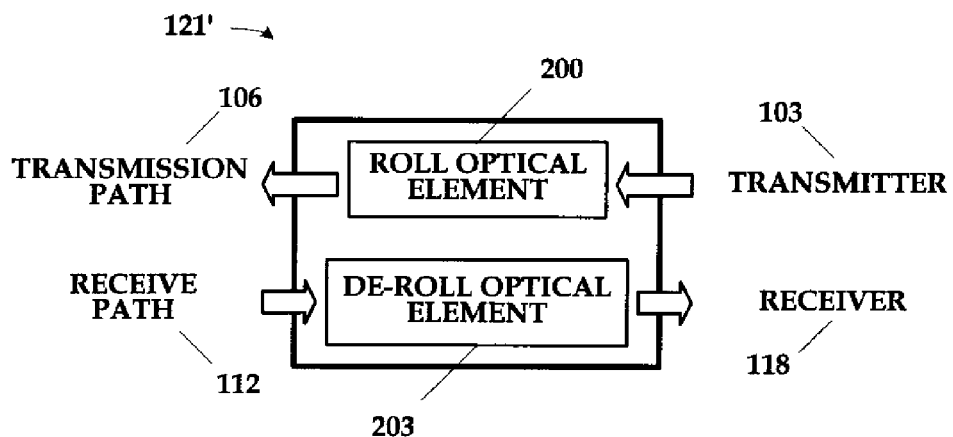
FIG. 2A-FIG. 2B are block diagrams illustrating alternative roll/de-roll mechanisms for the LADAR system of FIG. 1.
Figure 2B:
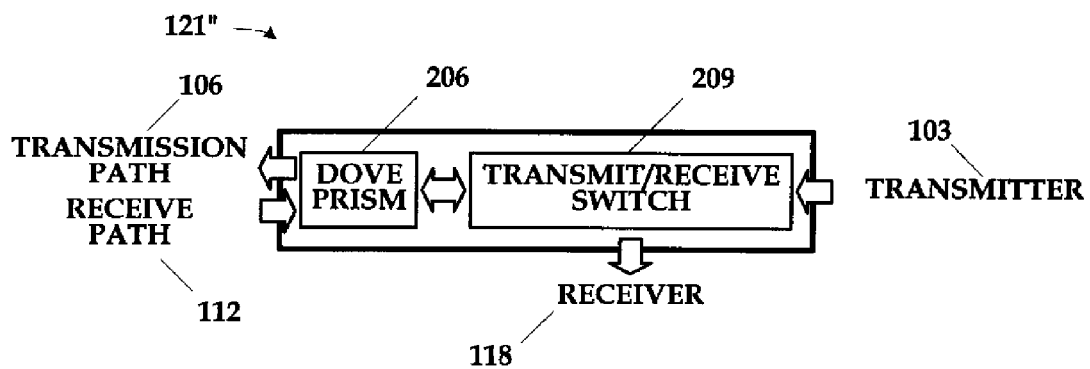

FIG. 2A-FIG. 2B are block diagrams illustrating alternative roll/de-roll mechanisms for the LADAR system of FIG. 1. As is shown in FIG. 2A-FIG. 2B, the optical roll/de-roll mechanism 121 may be implemented in a manner in which the transmit and receive paths 106, 112 are independent or in a manner in which they are coincident. Note that, if the transmit and receive paths 106, 112 are independent, the de-roll of the receive path 112 will be matched to the roll of the transmit path 106. In some applications, this may prove difficult to do in practice, and so implementations in which the transmit and receive paths 106, 112 are coincident may be preferred for these applications. Such an embodiment may also have other advantages such as fewer parts, lower cost, less complexity, and higher reliability.

More particularly, FIG. 2A depicts an optical roll/de-roll mechanism 121' comprising a roll optical element 200 positioned in the transmit path 106 and a de-roll optical element 203 positioned in the receive path 112. Either, or both, of the roll optical element 200 or the de-roll optical element 203 may be implemented using, for example, a Dove prism, an optical element known to the art. However, alternative embodiments may use alternative types of optical elements. As was noted above, the roll and de-roll of the optical roll/de-roll mechanism 121' should be matched, which means that the performance of the roll optical element 200 and de-roll optical element 203 should be matched in this particular embodiment.

FIG. 2B depicts an optical roll/de-roll mechanism 121" comprising a single roll/de-roll optical element 206 positioned in both the transmit and receive paths 106, 112. In the embodiment illustrated, the roll/de-roll optical element 206 is implemented using a Dove prism. The optical roll/de-roll mechanism 121" employs a transmit/receive switch 209 capable of switching the roll/de-roll optical element 206 between the transmission and receive paths 106, 112. Thus, when the LADAR apparatus 100 transmits the LADAR signal 109, the transmit/receive switch 209 switches the roll/de-roll optical element 206 into the transmit path 106. When the LADAR apparatus 100 receives the reflection 115, the transmit/receive switch 209 switches the roll/de-roll optical element 206 into the receive path 112.

As mentioned above, both embodiments of the optical roll/de-roll mechanism 121 illustrated in FIG. 2A-FIG. 2B may be implemented using one or more Dove prisms. Dove prisms are known to the art and are used as image rotators. For instance, Dove prisms have been used in passive imaging devices to "de-roll" the images prior to being focused on the focal plane array. Total internal reflection ("TIR") is used to rotate the image. Looking longitudinally through the prism and rotating it, the image rotates through twice as much angle as the prism. The object and its inverted image created by Dove prism lie on a common axis. As the prism is rotated around an axis parallel to hypotenuse face, the image passing through will rotate at twice the angular velocity of the prism. Light entering the Dove prism should be parallel or collimated, because the length of the prism is typically four or five times the height of the prism and to avoid spherical aberration.

For this application, the LADAR apparatus 100 is an active transmitting device. Assume that the LADAR signal 109 transmission and the reflection 115 detection are aligned horizontally in a 1×N configuration. With no dove prism, the beams go out horizontally and are received in the same fashion. If a dove prism is put into the transmit/receive path, rotating the Dove prism rotates the horizontally transmitted LADAR signal 109 at twice the rotation of the Dove prism. Thus, a 90° prism rotation results in a 180° rotation of the image. When the reflection 115 is received, it is received at the same angle as the LADAR signal 109 was transmitted and is then rotated back ("de-rolled") to the original horizontal configuration. This allows the LADAR apparatus 100 to maintain the horizontal configuration of the transmit/receive, but rotate the image spots in the scene by rotating the dove prism. Note that angles other than the horizontal may be used for the LADAR signal 109 transmission and the reflection 115 detection.

Figure 3:
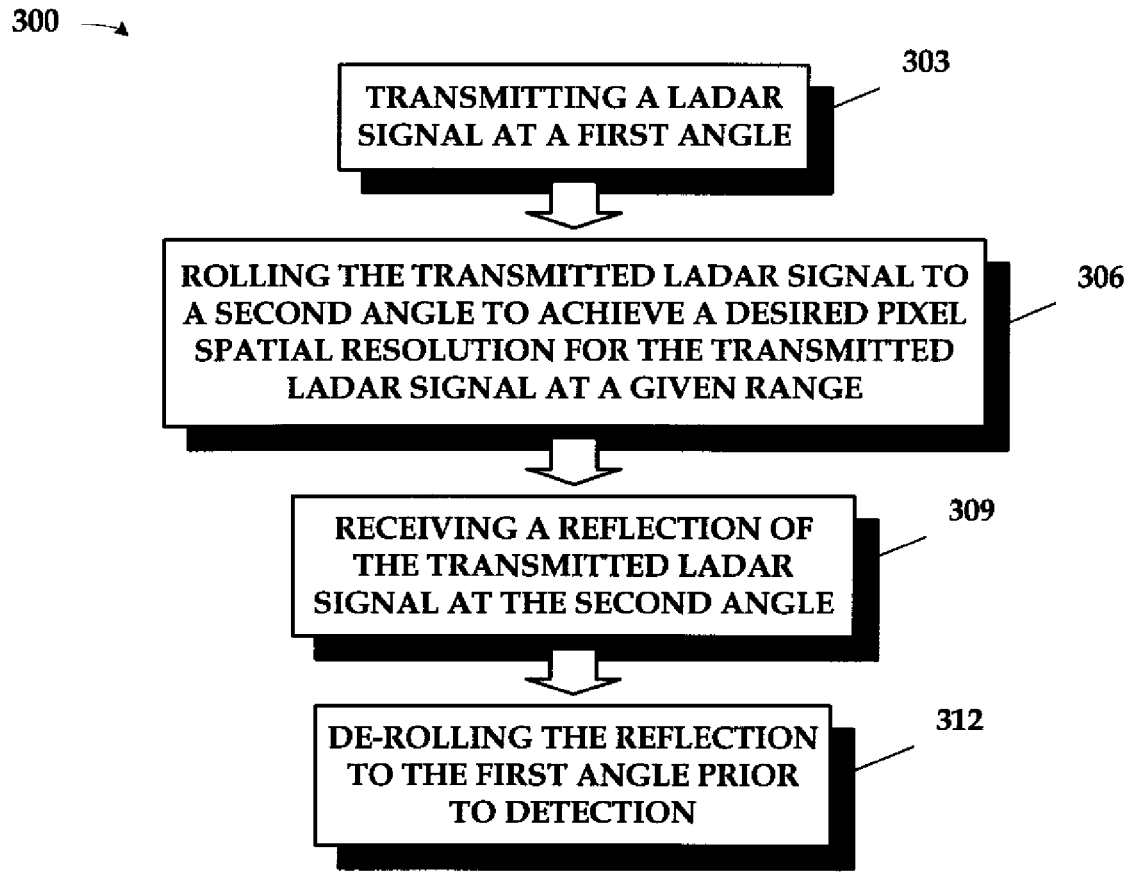
FIG. 3 illustrates one embodiment of a method practiced in accordance with the present invention.

FIG. 3 illustrates one embodiment of a method 300 practiced in accordance with the present invention. The method 300 begins by transmitting (at 303) the LADAR signal 109 at a first angle (not shown). In the illustrated embodiment, this first angle is the horizontal. The method 300 continues by rolling (at 306) the transmitted LADAR signal 109 to a second angle (also not shown) to achieve a desired pixel spatial resolution for the transmitted LADAR signal 109 at a given range. Next, the method 300 receives (at 309) the reflection 115 of the transmitted LADAR signal 109 at the second angle. Finally, the method then de-rolls (at 312) the reflection 112 to the first angle prior to detection.

For the sake of clarity, and so as not to obscure the present invention, the method 300 is presented above in the context of the operation of the LADAR apparatus 100 in FIG. 1. Note, however, that the method 300 may be practiced with LADAR systems other than the LADAR apparatus 100 of FIG. 1. Thus, by way of example and illustration:

(i) the transmitter 103 and transmit path 106 are but one means for transmitting the LADAR signal 109 at a first angle;

(ii) the optical roll/de-roll mechanisms 121', 121" are but two means for rolling the transmitted LADAR signal 109 to a second angle to achieve a desired pixel spatial resolution for the transmitted LADAR signal 109 at a given range and de-rolling the reflection 115 to the first angle prior to detection; and (iii) the receive path 112 and receiver 118 are but one means for receiving a reflection 115 of the transmitted LADAR signal 109 at the second angle, in accordance with the present invention.

Other means not illustrated may be employed in alternative embodiments. For instance, both the optical roll/de-roll mechanisms 121', 121" employ optical elements, i.e., the optical elements 200, 203, 206. However, some embodiments may use a plurality of digital devices to electronically, rather than optically, rotate the image presented by the LADAR signal 109 and the reflection 115. Furthermore, composition of the transmit and receive paths 106, 112 will be implementation specific, and may comprise optical and/or electronic element in addition to or in lieu of those disclosed herein. Still further, variations in transmitter and receiver technology may be realized within the scope of the present invention as defined by the claims.

Figure 4:
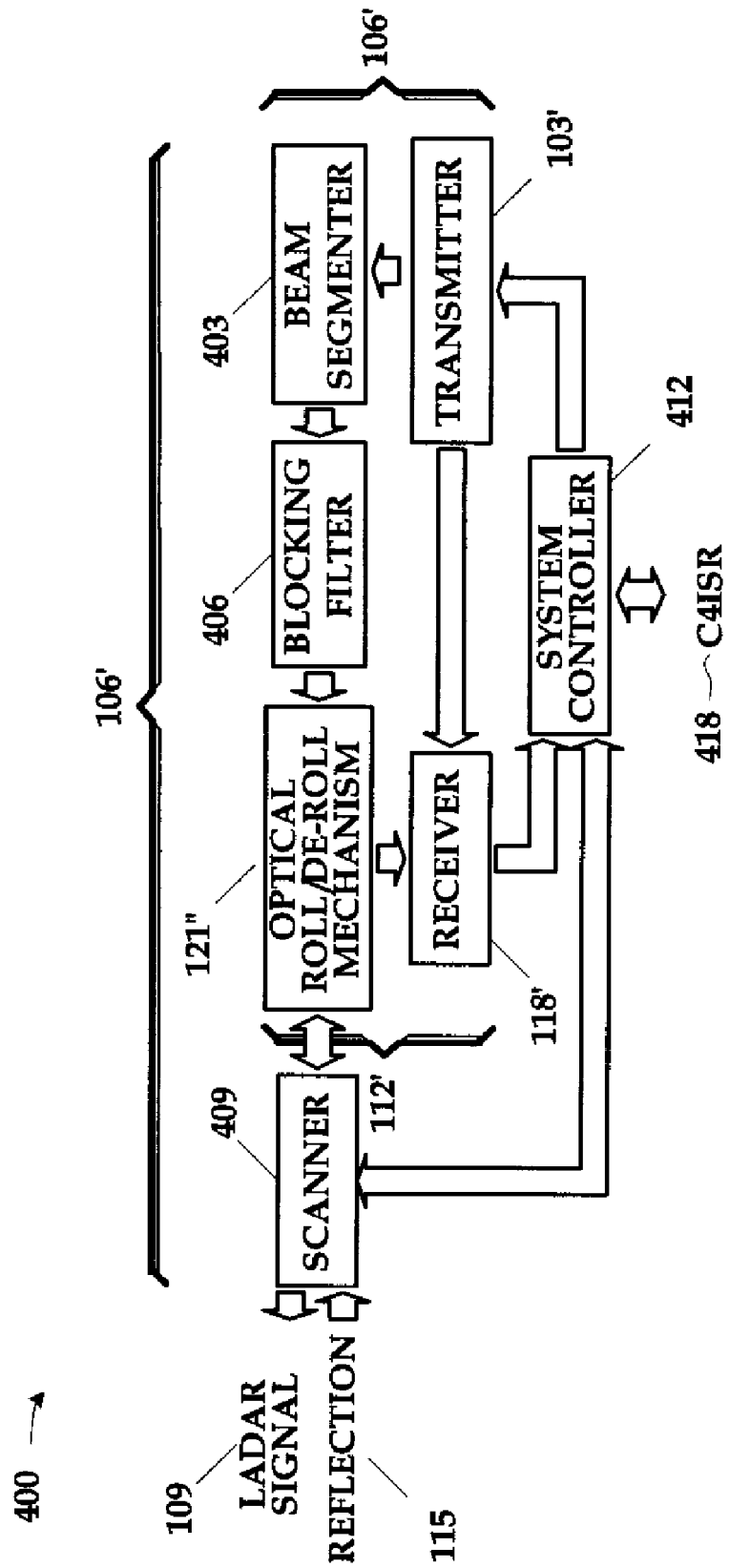
FIG. 4 illustrates one particular embodiment of the LADAR apparatus of FIG. 1.

FIG. 4 illustrates a LADAR apparatus 400, which is one particular embodiment of the LADAR apparatus 100. An optical roll/de-roll mechanism 121", such as the one first shown in FIG. 2B, is positioned in both the transmit path 106' and the receive path 112'. The transmit path 106' also includes a transmitter 103', a beam segmenter 403, a blocking filter 406, and a scanner 409. The receive path 112' includes, in addition to the optical roll/de-roll mechanism 121", a receiver 118'. The LADAR signal 109 is transmitted and the reflection 115 received through a common aperture (not shown) in a housing (also not shown). A system controller 412 coordinates and controls the operation of the LADAR apparatus 400. The illustrated embodiment is intended for use in an unmanned aerial vehicle for military use. Accordingly, the system controller 412 interfaces the LADAR apparatus 400 with command, control, communications, computers, intelligence, surveillance, and reconnaissance subsystems ("C4ISR") 415.

The scanner 409, transmitter 103', the receiver 118', and the system controller 412 may be implemented in any suitable manner known to the art. The invention is not limited by the implementation of these components of the LADAR apparatus 400. In the illustrated embodiment, the scanner 409 is a linear array scanner and, more particularly, a 1×7 linear array scanner. The linear array is typically implemented by optical fibers coupled to discrete avalanche photodiodes ("APDs"), but may alternatively be detectors. However, other embodiments might employ an M×N array, e.g., 2×3. To further an understanding of the invention, the transmitter 103', the receiver 118', and the system controller 412 of the illustrated embodiment are detailed in FIG. 5A-FIG. 5C, respectively, and are discussed further below.

Figure 5A:
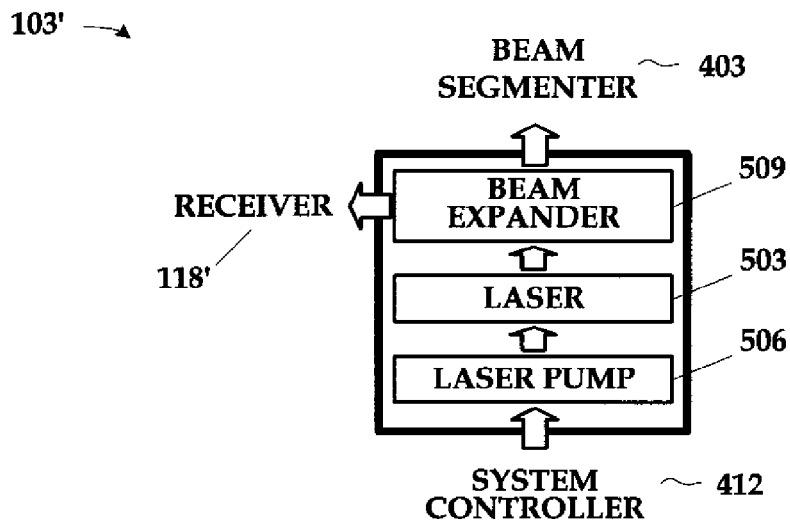
FIG. 5A-FIG. 5C illustrate in block diagrams the transmitter, receiver, and system controller, respectively, of the LADAR apparatus of FIG. 4.
Figure 5B:
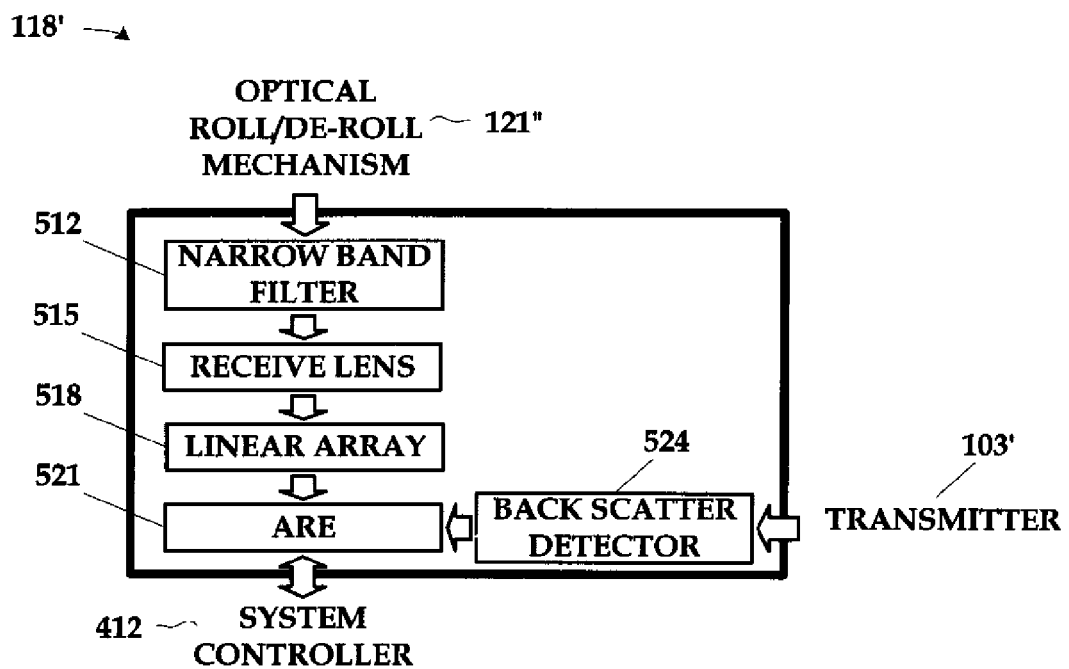

FIG. 5A illustrates the transmitter 103' in greater detail. The transmitter 103' includes a laser 503 pumped by a laser pump 506 to generate the LADAR signal 109 in the first instance. The generated LADAR signal 109 then passes through a beam expander 509. The beam expander 509 may comprise a series of negative and positive lenses (not shown) that expand the diameter of the beam of the LADAR signal 109, suitably by an 8:1 ratio. The action of the beam expander 509 also decreases the divergence of the beam. The expanded beam is then output from the transmitter 103' to the beam segmenter 403, shown in FIG. 4.

The laser 503 and laser pump 506 may be implemented in any manner known to the art. Suitable laser/laser pump combinations are disclosed in, inter alia:

(i) U.S. Pat. No. 5,200,606, entitled "Laser Radar Scanning System," issued Apr. 6, 1993, to LTV Missiles and Electronics Group as assignee of the inventors Nicholas J. Krasutsky, et al; and (ii) U.S. Pat. No. 5,224,109, entitled "Laser Radar Transceiver," issued Jun. 29, 1993, to LTV Missiles and Electronics Group as assignee of the inventors Nicholas J. Krasutsky, et al.

However, any suitable mechanism known to the art may be employed.

In an implementation such as those shown in the listed references, the laser 503 may be a Neodymium doped yttrium aluminum garnet (YAG), a yttrium lithium fluoride (YLF), or Nd:YVO$_4$ laser operable to produce pulses with widths of 10 to 20 nanoseconds, peak power levels of approximately 10 kilowatts, at repetition rates of 10-120 KHz. The equivalent average power is in the range of 1 to 4 watts. The preferred range of wavelengths of the output radiation is in the near infrared range, e.g., 1047 or 1.064 microns. The laser pump 506 may be gallium aluminum arsenide pumping laser that produces a continuous signal of wavelengths suitable for pumping the laser 503, e.g., in the crystal absorption bandwidth. The laser pump 506 has an output power, suitably in the 10-20 watt range, sufficient to actuate the laser 503.

Figure 6:
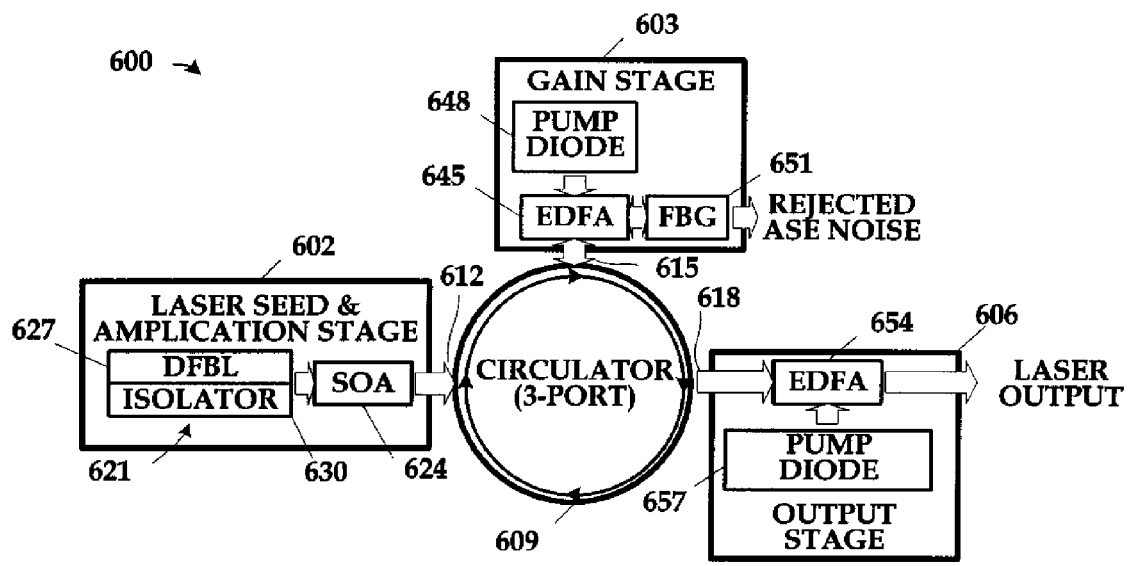
FIG. 6 illustrates an alternative fiber laser that may be employed by the transmitter of the LADAR apparatus of FIG. 4 and shown in FIG. 5A.

Alternative embodiments may employ a "fiber laser", such as the one shown in FIG. 6. Fiber lasers and their components are well known in the telecommunications arts, but are not found in the LADAR arts. FIG. 6 illustrates one such fiber laser 600 as is disclosed and claimed in U.S. application Ser. No. 10/886,976, entitled "Fiber Laser LADAR", and filed Jul. 8, 2004, in the name of Christopher E. Michael and Bruno J. Evans, and commonly assigned herewith.

Turning now to FIG. 6, a first fiber laser 600 is shown in a block diagram. In general, the fiber laser 600 comprises three stages: a laser seed and amplification stage 602, a gain stage 603, and an output stage 606. A three-port circulator 609 controls the configuration of the path of the LADAR signal 109 first generated by the laser seed and amplification stage 602 through the fiber laser 600. In general, the laser seed and amplification stage 603 generates a LADAR signal 109, as represented by the arrow 612, that is directed by the circulator 609 to the gain stage 603, as indicated by the arrow 615. The gain stage 603 amplifies the LADAR signal 109 and filters out noise, e.g., in the form of amplified spontaneous emissions ("ASE"). The amplified, filtered LADAR signal 109 is then directed by the circulator 609, as indicated by the arrows 615, 618 to the output stage 606. The output stage 606 once again amplifies and then outputs the LADAR signal 109.

More technically, the laser seed and amplification stage 602 includes a laser seed 621 and semiconductor optical amplifier ("SOA") 624. The seed 621 comprises a directly modulated, distributed feedback laser ("DFBL") 627 and an isolator 630. The DFBL 627 actually generates the LADAR signal 109 in the first instance. The isolator 630 protects the DFBL 627 by blocking backscatter, i.e., reflections of the LADAR signal 109 caused by encountering the components of the fiber laser 600. As will be appreciated by those skilled in the art having the benefit of this disclosure, when the LADAR signal 109 encounters a component such as, for example, the circulator 609, the gain stage 603, or the output stage 606, a portion of the LADAR signal 109 is reflected back down the optical path. This "backscatter", if not blocked, interferes with the operation of the DFBL laser 627. Hence, the inclusion of the isolator 630 to shield the DFBL laser 627. Note that the isolator 630 is tuned to block the backscatter without hindering the transmission of the LADAR signal 109.

Note that different types of optical isolators may be used in different embodiments. If the output from the DFBL 637 is highly polarized, then a simple polarizing isolator may be used. Whether to use a single or double stage isolator will depend on the isolation requirements of the DFBL 637. The wavelength of the isolator 630 will be centered on the output frequency of the DFBL 637. If the system is based on Erbium-doped, fiber amplifiers ("EDFAs"), as is the illustrated embodiment, then that wavelength will be approximately 1.55 um.

In general, the illustrated embodiment includes several isolators at various points. The isolators in the system will be chosen based on the needs of the system at the points where they are employed. The isolator 621 after the DFBL 627 will have very low reflectance (the light coming out of the DFBL 627 must not reflect back into the DFBL 627), and very good isolation (light coming into the output end of the isolator 621 must be extinguished at the isolator 621. Isolators used elsewhere in the system are polarization insensitive due to the non-polarization maintaining nature of the fiber optics and amplifiers. These might accentuate transitivity over isolation, although this is not likely). There is not a whole lot of tuning to do with isolators since their performance does not vary greatly between implementations. Isolators are used to prevent random and backscattered light from traveling back through the system and quenching the gain of the EDFAs. All isolators will be chosen for the signal wavelength of 1.55 μm in the illustrated embodiment.

The circulator 609 is a three-port, optoelectric device useful for wavelength multiplexing signals. The circulator 609 directs the propagation of the LADAR signal 109, indicated by the arrow 612, from the laser feed and amplification stage 602, to the gain stage 603, and then to the output stage 606. Such circulators are known in the telecommunications arts and any suitable circulator known to that art may be used.

More particularly, the circulator 609 routes the signal from seed to gain to output. In the case where a 4 port circulator is used it also routes the signal to the detector. A circulator is module that has three or four ports. In one implementation of a circulator, light enters one port and is split into two polarizations by a polarized beam splitter ("PBS", not shown). Those two polarizations are rotated and recombined and the recombined light is output through the next port. Light coming into that next port is also separated and rotated. When the rotated light encounters the PBS it is sent along a different optical path from the first port is transmitted out the third port. This can be repeated once more for a 4 port circulator. The circulator 609 in the illustrated embodiment is rated to handle the high powers of the system and made for a wavelength of 1.55 um, which is a standard wavelength.

The circulator 609 directs the LADAR signal 109, represented by the arrow 612, from the laser seed and amplification stage 602 to the gain stage 603. The gain stage 603 comprises an EDFA 645 pumped by a pump diode 648 and/or one or more narrow-band, fiber Bragg Gratings ("FBG") 651. EDFAs and FBGs are well known in the telecommunications arts, and suitable, commercial, off-the-shelf EDFAs and FBGs are available from vendors in this art. Any suitable EDFA and/or FBG known to the telecommunications arts may be used to implement the EDFA 645 and FBG(s) 651.

The EDFA 645 amplifies the LADAR signal 109 received via the circulator 609, as indicated by the arrow 615. The EDFA 645 gets the energy that it transfers to LADAR signal 109 from the pump diode 648. Pump diodes such as the pump diode 648 are powered by a DC current. Typically, a unit (not shown) is employed to regulate the current to the pump diode 648 to ensure that it is not damaged. Pump diodes are essentially high power diode lasers that have been "fiber coupled", that is their laser light output is directed into an optical fiber. The laser light from the pump diodes 648 is of a certain frequency such that it excites the EDFA 645. The laser light of the signal is of a certain frequency such that when it enters an excited EDFA 645 the EDFA 645 releases its energy as laser light. The laser light of the signal thus effectively amplified.

The FBG(s) 651 are tuned to reflect only the laser and pump wavelengths of the LADAR signal 109 and permit the ASE to propagate through and out of the fiber laser 600. The FBG 651 is a length of optical fiber that has been designed to reflect one specific frequency of light. It is used in this application to reflect the signal frequency as it exits the EDFA 645 so that the signal propagates once again through the EDFA 645 and is further amplified. A second FBG 651 can be used to reflect pump laser light when it will improve the system performance. In general, FBGs 651 are fabricated by writing a diffraction grating into a short length of optical fiber and are well known in the telecommunications arts. Each FBG 651 reflects one particular wavelength and transmits all others. Multiple FBGs 651 can be multiplexed in series along a single optical fiber to filter a spectrum of noise. The rejection of the ASE in this manner improves the signal-to-noise ratio ("S/N ratio") of the LADAR signal 109, and therefore the quality of the LADAR signal 109. The "improved" LADAR signal 109 is reflected back through the EDFA 645, as indicated by the arrow 615, whereupon it is amplified once again, and then to the circulator 609.

The circulator 609 then directs the LADAR signal 109 to the output stage 609, as indicated by the arrow 618. The output stage 606 comprises a second EDFA 654 powered by a second pump diode 657. The EDFA 654 amplifies the LADAR signal 109 once again, and outputs the generated LADAR signal 109

Note that some portions of the embodiment 600 may be "optimized" or "tuned" for use in a given embodiment to, e.g., provide higher amplification. For instance, the LADAR signal 109 will inherently include some noise in the form of amplified spontaneous emissions ("ASE"). The object of the tuning is to achieve a desired level of amplification for the LADAR signal 109 while controlling the level of noise introduced into the signal by that amplification Such tuning will be implementation specific, depending on the optical characteristics of the components in the LADAR transceiver 300. Suitable tuning techniques are known to the telecommunications arts and can be readily adapted to the present invention by those skilled in the art having the benefit of this disclosure. One suitable reference for device level tuning is "Erbium-Doped Fiber Amplifiers" by P. C. Becker, Academic Press, May 15, 1999 (ISBN 0120845903).

For instance, with respect to the gain stage 603 and the output stage 606, two important characteristics in this tuning are the length of the optical path provided by the optical fibers and the power of the pump diodes 648, 657. The EDFAs 645, 654, as mentioned before, are excited by the pump diodes 648, 657. When the EDFAs 645, 654 are in this excited state, the erbium ions can spontaneously release their energy in the form of a photon at the signal wavelength. This is not part of the signal and is referred to as noise, or amplified spontaneous emission ("ASE"). As this photon moves along the length of the EDFA 645, 654, it stimulates other Erbium ions to release their energy.

The length of the EDFAs 645, 654 thus is a factor in determining the amplitude of the noise level. When this ASE noise is generated, it is essentially taking away from the number of excited erbium ions that are available for amplifying the signal. If the EDFA 645, 654 is sufficiently long then the ASE will use up all the erbium ions and the EDFA 645, 654 will effectively attenuate the signal. The number of excited erbium ions available for signal amplification may be increase by increasing the power of pump diode laser light (i.e., to increase the number of photons traveling through the EDFA 645, 654 at the correct wavelength). Thus, pump diode power, EDFA length, and acceptable noise have to be balanced to achieve the results desired.

Returning to FIG. 5B, the receiver 118' includes a narrow band filter 512, a receive lens 515, a linear array 518 of detectors, and some analog receiver electronics ("ARE") 521. The narrow band filter 512 filters noise from the received reflection 115 prior to its detection. The linear array 518 of detectors comprises a linear array of avalanche photodiodes ("APDs", not shown) such as are known in the art. As will be discussed further below, the LADAR signal 109 is a split beam signal in the illustrated embodiment. The linear array 518 is configured to detect the beamlets comprising the split beam LADAR signal 109 in a manner known to the art. The receive lens 515 focuses the filtered, received reflection 112 onto the APDs of the linear array 518. The ARE 521 comprises the discrete detectors and their associated electronics, neither of which are individually shown.

The receiver 118' also includes a backscatter detector 524 for two purposes. The receiver 118' employs a technique known to the art as "range gating" to ease computational burden and facilitate other operational considerations. Range gating is a technique in which the linear array 518 detects energy only during a time window in which the reflection 112 is expected to arrive. Range gating requires a knowledge of when the LADAR signal 109 is fired. To this end, the receiver 118' therefore includes the backscatter detector 524 that indicates to the ARE 521 when the LADAR signal 109 is transmitted. The backscatter detector 524 detects the backscatter generated when the LADAR signal 109 is transmitted. Thus, the ARE 521 will know when the window in which the reflection 112 is expected opens. Knowing when the LADAR signal 109 is transmitted also permits the PCE 527 of the system controller 412, shown in FIG. 5C, to extract accurate range information from the reflection 112. Note that alternative embodiments may employ other techniques for determining when the LADAR signal 109 is transmitted.

Figure 5C:
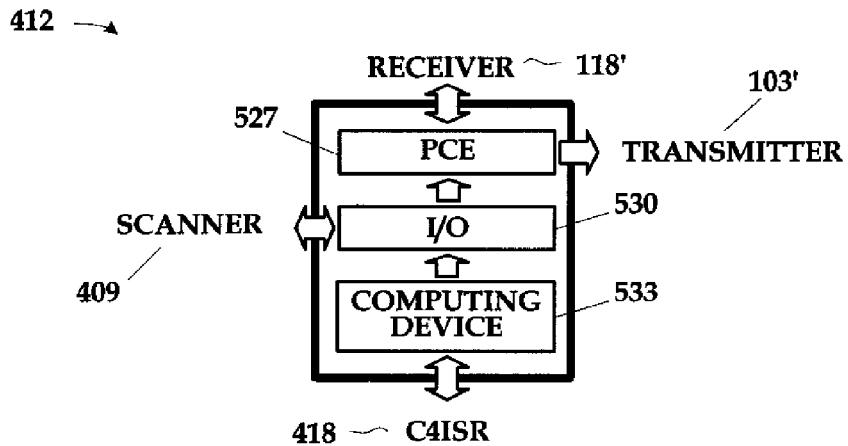

FIG. 5C illustrates the system controller 412 of the LADAR apparatus 400 in FIG. 4. The system controller 412 includes a plurality of pulse capture electronics ("PCE") 527 that capture and process the received reflection 112 detected by the linear array 518 of the receiver 118' as discussed above. The PCE 527 of the illustrated embodiment may employ techniques such as those disclosed in:

(i) U.S. Pat. No. 6,115,113, entitled "Method for Increasing Single-Pulse Range Resolution", issued Sep. 5, 2000, to Lockheed Martin Corporation as assignee of the inventor Stuart W. Flockencier;

(ii) U.S. Pat. No. 5,511,015, entitled "Double-accumulator implementation of the convolution function", issued Apr. 23, 1996, to Loral Vought Systems Corporation as assignee of the inventor Stuart W. Flockencier;

(iii) U.S. Pat. No. 5,357,331, entitled "System for Processing Reflected Energy Signals", issued Oct. 18, 1994, to Loral Vought Systems Corporation as assignee of the inventor Stuart W. Flockencier; and (iv) U.S. Pat. No. 5,243,553, entitled "Gate Array Pulse Capture Device", issued Sep. 7, 1993, to Loral Vought Systems Corporation as assignee of the inventor Stuart W. Flockencier.

However, other techniques may be employed. The PCE 527 also sends the laser fire command to the laser 503, shown in FIG. 5A, of the transmitter 103'.

The system controller 412 also includes input/output ("I/O") 530 through which the system controller 412 communicates with the scanner 409. As will be discussed further below, the scanner 409 scans in both azimuth and in elevation as it transmits the LADAR signal 109. The system controller 412 sends signals (not shown) to the scanner 409 that control the azimuth and elevational scans to achieve the desired sampled spatial resolution. The system controller 412 also receives signals from the scanner 409 that tell the system controller 412 the actual position of the scanner 409 at any given time. The scanner resolution may drift by some small percentage over time. It is desirable to know this drift when converting the range, angle, and angle data to x-y-z coordinates. Thus, scanner 409 provides position feedback to indicate where it is actually pointed and the resolution at which it is really collecting data.

Finally, the system controller 412 includes a computing device 533 that carries the computational burden for the system controller 412. The LADAR apparatus 400 will be operating under tight time constraints and will need to process large amounts of information in short periods of time. The implementation of the computing device 533 will therefore significantly impact the performance of the LADAR apparatus 400. Thus, some kinds of computing devices are more desirable than others for implementing the computing device 533 than others. For instance, a digital signal processor ("DSP") may be more desirable for the illustrated embodiment than will be a general purpose microprocessor. In some embodiments, the computing device 533 may be implemented as a processor set, such as a microprocessor with a math co-processor.

Figure 7:
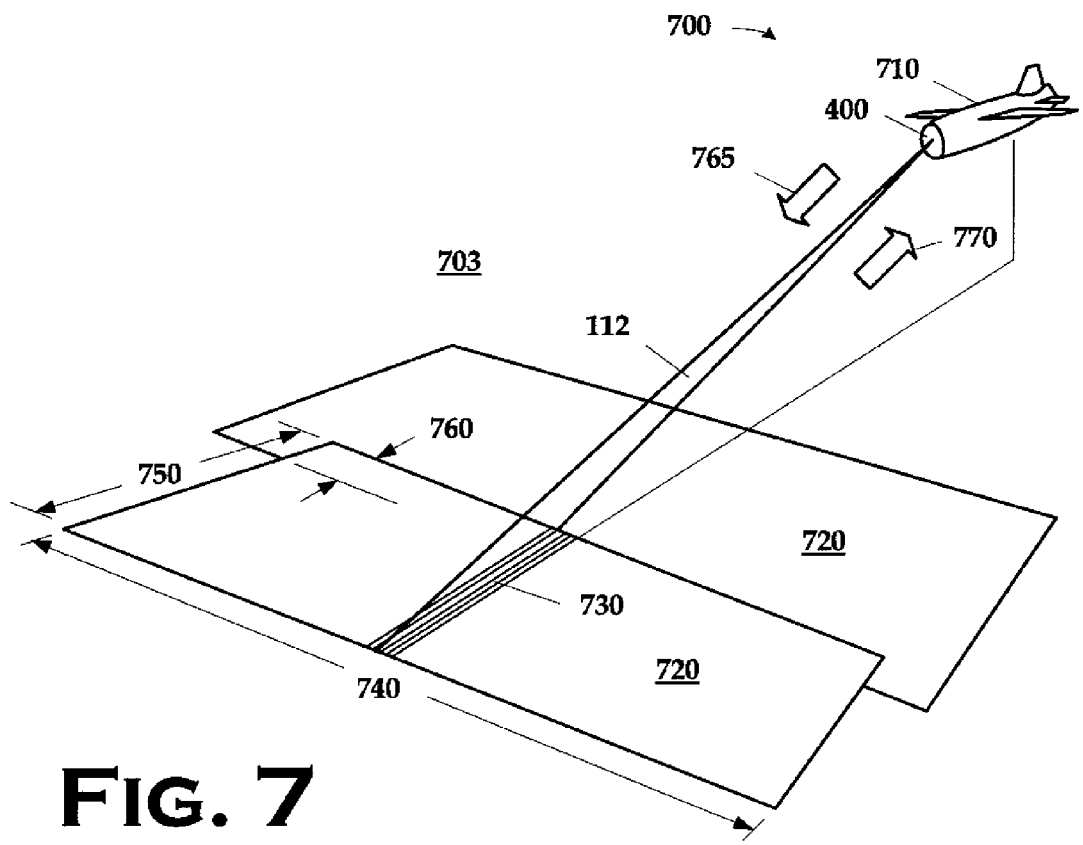
FIG. 7 illustrates the operation of the LADAR apparatus of FIG. 4 in one particular embodiment.

Returning to FIG. 4, the LADAR apparatus 400 is packaged as a LADAR seeker head and mounted in an unmanned aerial vehicle ("UAV"). For example, FIG. 7 depicts one particular embodiment of a LADAR system 700 in accordance with the present invention. This particular LADAR system 700 is a multi-beam pulsed imaging system. In general, a frame of image data is composed of groups (or nods) of scan lines formed from multiple beams with individual receiver channels. Every firing of the laser produces a set of scene pixels. Each of the receive data channels (plus a reference) has a separate fiber-coupled photo-detector to convert the optical return into an electrical pulse. Signal processing then extracts digital range and intensity values for each pixel.

More particularly, the LADAR system 700 acquires data about a field of view 703 through LADAR apparatus 400 aboard a platform 710. The LADAR apparatus 400 transmits the LADAR signal 109, as represented by the arrow 765, through the field of view 703. The platform 710 may be, for example, a reconnaissance drone or a flying submunition in the illustrated embodiment. In alternative embodiments, the platform 710 may be a ground vehicle, or a watercraft, or perhaps even a stationary post. There is no requirement that the platform 710 be a vehicle. The nature of the platform 710 in any given implementation is immaterial.

The LADAR apparatus 400 transmits the LADAR signal 109 using an acquisition technique described above in what is known as a "scanned" illumination technique. The LADAR signal 109 is typically a pulsed, split-beam LADAR signal. The LADAR apparatus 400 produces a pulsed (i.e., non-continuous) single beam that is then split into several beamlets as discussed above spaced apart from one another by a predetermined amount. Thus, the transmitter 103' generates the LADAR signal 109. The expanded beam output by the transmitter 103' is next passed through a beam segmenter 403 for dividing the beam into a plurality of beam segments arrayed on a common plane, initially overlapping, and diverging in a fan shaped array. The divergence of the segmented beams is not so great as to produce separation of the beams within the optical system, but preferably is sufficiently great to provide a small degree of separation at the target, as the fan-shaped beam array is scanned back and forth over the target.

The segmented beams then pass through the blocking filter 406. The blocking filter 406 only allows the primary wavelength of the laser signal out. As those in the art having the benefit of this disclosure will appreciate, most lasers leak the pump frequency and can also output harmonics of the primary frequency. These other frequencies are undesirable, and so are filtered out by the blocking filter 406. The filtered, segmented beams are then passed through the optical roll/de-roll mechanism 121". The scanner 412 therefore transmits a LADAR signal 109 that is actually, in the illustrated embodiment, a series of grouped beamlets. The scanner 412 transmits the LADAR signal 109 while scanning in azimuth and in elevation across the field of view 703.

More particularly, the LADAR apparatus 400 transmits the LADAR signal 109 to scan a geographical area called a "scan pattern" 720, shown in FIG. 7. Each scan pattern 720 is generated by scanning elevationally, or vertically, several times while scanning azimuthally, or horizontally, once within the field of view 703 for the platform 710. Various techniques are known to the art for scanning a LADAR signal such as the LADAR signal 109 into a field of view. See, e.g.:

(i) U.S. Pat. No. 5,200,606, entitled "Laser Radar Scanning System," issued Apr. 6, 1993, to LTV Missiles and Electronics Group as assignee of the inventors Nicholas J. Krasutsky, et al; and (ii) U.S. Pat. No. 5,224,109, entitled "Laser Radar Transceiver," issued Jun. 29, 1993, to LTV Missiles and Electronics Group as assignee of the inventors Nicholas J. Krasutsky, et al.

Some of these techniques employ gimbals, in which some are all of the optics for transmitting the LADAR signal are mounted in a gimbal that can rotate in elevation, azimuth, or both. Others employ a galvo mirrors, or mirrors that are rotated in a similar fashion. Still other techniques might employ a combination of gimbals and galvo mirrors.

These known scanning techniques may be readily adapted by those skilled in the art having the benefit of this disclosure for use with the present invention. Still other techniques may be known to the art. Thus, gimbals and galvo mirrors are, by way of example and illustration, but two means for scanning a LADAR signal into a field of view. In various alternative embodiments, the scanner 409, shown in FIG. 4, therefore is a two-axis scanner comprising a gimbal, one or more galvo mirrors, some other suitable means, or some combination of these means.

Still referring to FIG. 7, a single elevational scan 730 during an azimuthal scan 740 for one scan pattern 720 is shown. Thus, each scan pattern 720 is defined by a plurality of elevational scans 750 such as the elevational scan 730 and the azimuthal scan 740. The principal difference between the successive scan patterns 720 is the location of the platform 710 at the start of the scanning process. An overlap 760 between the scan patterns 720 is determined by the velocity of the platform 710. The velocity, depression angle of the sensor with respect to the horizon, and total azimuth scan angle of the LADAR platform 710 determine the scan pattern 720 on the ground. Note that, if the platform 710 is relatively stationary, the overlap 760 may be complete, or nearly complete.

Thus, the LADAR system 703 transmits the pulsed LADAR signal 109 into field of view 703. Objects in the field of view 703 reflect the pulsed LADAR signal 109 back to the platform 710. The LADAR system 703 receives the reflected LADAR signal 109, i.e., the reflection 112, which is actually a set of reflected beamlets since the transmitted LADAR signal 109 comprises beamlets.

Figure 8A:
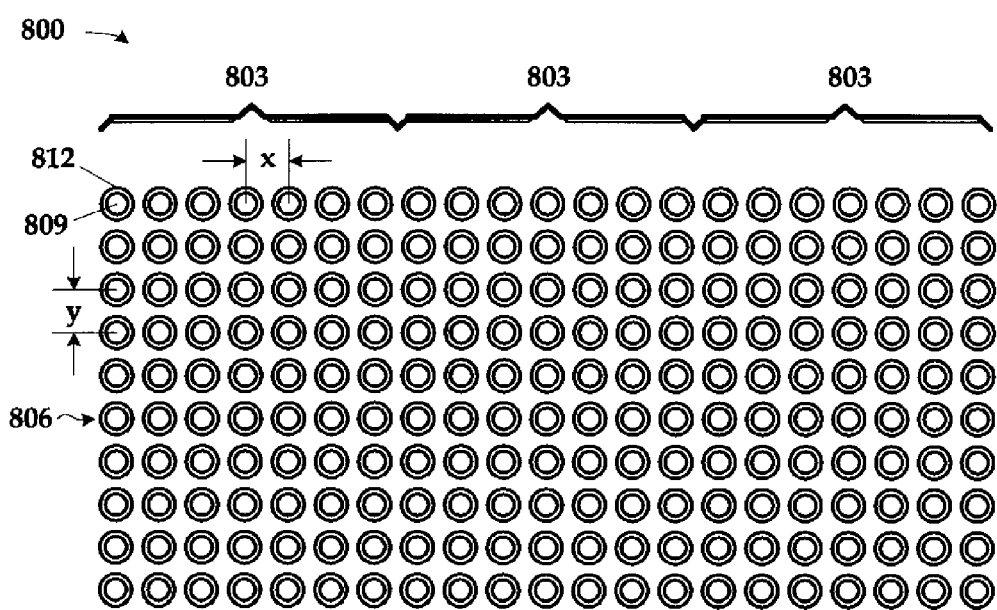
FIG. 8A-FIG. 8C illustrate the effect of the present invention on the far-field bean separation, and, hence the pixel spatial resolution.

The above discussion assumes a constant field of view for the LADAR apparatus 400. For purposes of illustration, assume that this field of view is at short range and does not require the LADAR apparatus 400 to roll the LADAR signal 109 prior to transmission or de-roll the reflection 112 upon receipt. The pixel spatial resolution on target for such a scenario is shown in FIG. 8A. More particularly, FIG. 8A depicts a representative nod pattern 800, comprising three nods 803. Each nod 803 comprises ten rows 806 (only one indicated) of seven beamlets 809 (only one indicated). Each beamlet 809 is shown within an instantaneous field of view ("IFOV") 812. Those in the art having the benefit of this disclosure will appreciate that a nod pattern will typically comprise many more nods 803 and many more rows 806, although this is not necessary to the practice of the invention. Similarly, the number of beamlets 809 in a row 806 may differ in various alternative embodiments.

The beamlets 809 are spaced apart in azimuth by a beam separation x and in elevation by a beam separation y. Note that the beam separations x and y are beam separations in the far field, e.g., at the range of the defined field of view. The beam separations x and y determine the number of pixels, i.e., reflections of the beamlets 809, "on target" and, hence, the resolution of the data extracted from the reflection 112, as was discussed above. For purposes of illustration, assume the FOV for the nod pattern 800 in FIG. 8A is at a relatively short range relative to the LADAR apparatus 400 on the platform 710. Furthermore, assume that the beam separations x, y yield the desired pixel spatial resolution for this particular application. For FOVs at relatively longer ranges, the beam separations x, y will increase, thereby decreasing resolution. Hence, the application of the present invention to achieve a desired pixel spatial resolution in FOVs at the relatively longer ranges.

Fundamentally, in the illustrated embodiment, any image passed through the dove prism 206, shown in FIG. 2, of the optical roll/de-roll mechanism 121", shown in FIG. 2 and FIG. 4, is rotated twice the rotation of the dove prism 206. So, with a horizontal linear 1×N array that is transmitted through a dove prism 206 that has been rotated 45°, the imaged scene is a 1×N vertical linear array. When the reflection 770, shown in FIG. 7, comes back through the dove prism 206, the vertical imaged scene is rotated back to the horizontal 1×N configuration. This allows the illustrated embodiment to align the transmit/receive for the baseline configuration, and then rotate the dove prism 206 to image the scene at any desired angle. When this is coupled with the scan mirror control, it permits the illustrated embodiment to vary the spatial resolution on the target.

Figure 8B:
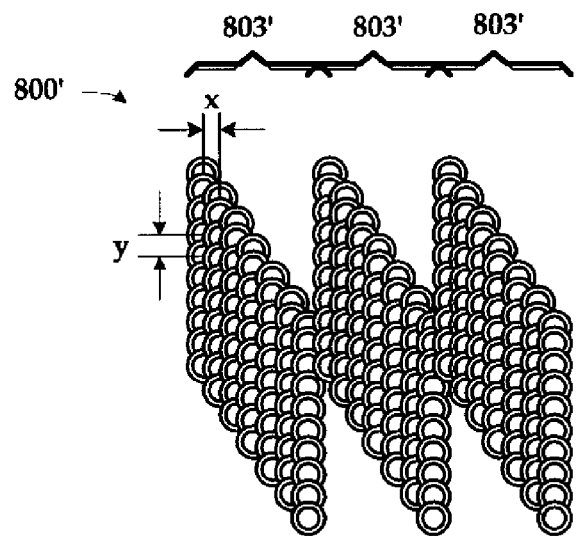

FIG. 8B illustrates a nod pattern 800' resulting from the application of the present invention to the nod pattern 800 in FIG. 8A in the same FOV. As was described above, the LADAR signal 109 is rolled during its transmission by the LADAR apparatus 400 and the elevational and azimuthal scan rates are decreased. Rolling the LADAR signal 109 effectively decreases the beam separation x in azimuth for a given field of view. For instance, if the beam separation x in azimuth is 10 cm in the nod pattern 800, then the beam separation x in the nod pattern 800' is 5 cm. The scan rates in elevation and azimuth for the scanner 409, shown in FIG. 4, are also decreased proportionally to decrease the separation between the nods 803 and the beam separation y in elevation to maintain the alignment of the beamlets 809 in the nod pattern 800' as a whole.

Figure 8C:
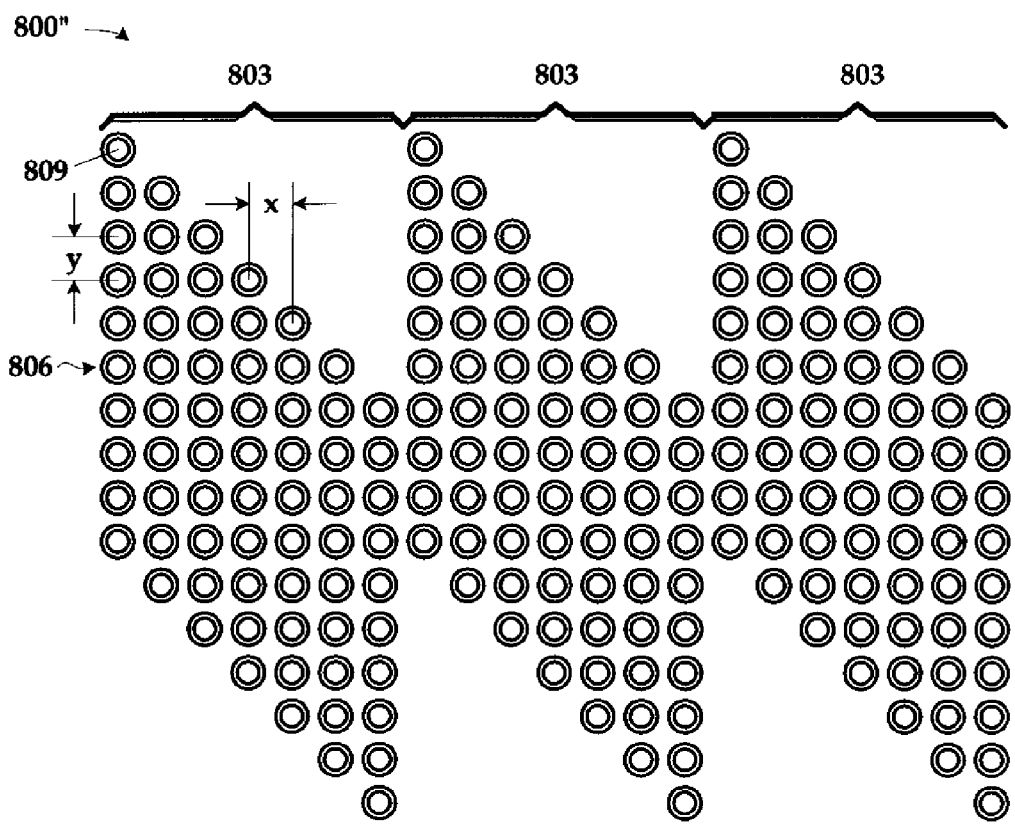

FIG. 8C illustrates a nod pattern 800" that results from the nod pattern 800', shown in FIG. 8B, in a FOV at a relatively longer range. At this relatively longer ranger, the beam separations x, y have returned to the dimensions seen in the nod pattern 800 of FIG. 8A. This increase in the dimensions is a natural consequence of the beamlets 209 propagating through a longer distance. Thus, the desired pixel spatial resolution has been maintained at both the relatively shorter range and the relatively longer range using the same optics and electronics by rolling and de-rolling the LADAR signal 109 and its reflection 112.

The beam separation x in azimuth is an "angular beam spacing", and is a function of the nominal beam spacing (i.e., the spacing at which the beamlets 809 are transmitted), the range of the FOV of interest, and the amount by which the LADAR signal 109 is rolled. This can be expressed mathematically as:

$$x = x_n \cos \alpha$$

where:
 x=the angular beam spacing;
 $x_n$=nominal beam spacing; and
 α=angle of rotation that the LADAR signal 112 is rolled by.

For example, assume we desire a 50 μrad beam spacing on target in a given FOV. Assume that the LADAR signal 112 is transmitted from a linear array having a nominal beam spacing of 100 μrads. Then:

$$\alpha = \cos^{-1}(x/x_N) = \cos^{-1}(0.00005/0.00001) = 60°$$

In the illustrated embodiment, the roll is introduced by rotating a Dove prism, as described above. A Dove prism will introduce a roll that it twice its angle of rotation. Thus, to achieve a roll of 60° in the current example, the Dove prism should be rotated 30° from the normal defined by the LADAR signal 112 as it is output by the transmitter 103'.

Returning now to FIG. 7, the platform 710 moves through an environment in accordance with its mission profile. The LADAR apparatus 400 acquires data regarding the environment as previously described relative to FIG. 7. Periodically, as mission parameters change or as conditions warrant, the LADAR apparatus 400 will change its FOV. If the range of the FOV changes such that the pixel spatial resolution is not what it desired, e.g., by an order of magnitude or more, the LADAR apparatus 400 employs the method 300, discussed above relative to and illustrated in FIG. 3. More particularly, the LADAR apparatus 400 rolls the LADAR signal 109 appropriately during its transmission to achieve the desired pixel spatial resolution.

Figure 9:
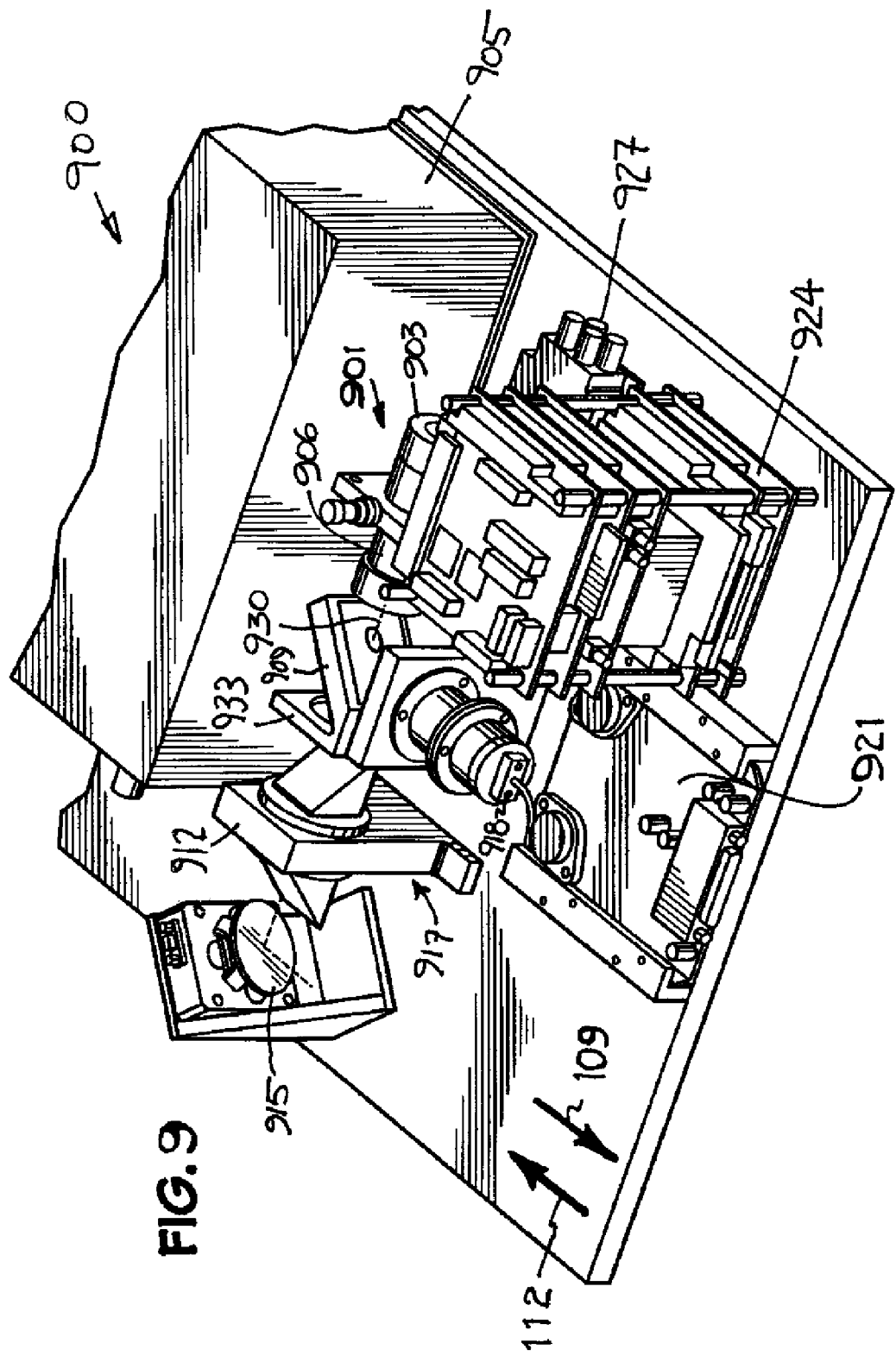
FIG. 9 illustrates one particular embodiment of the LADAR apparatus of FIG. 1.
Figure 10:
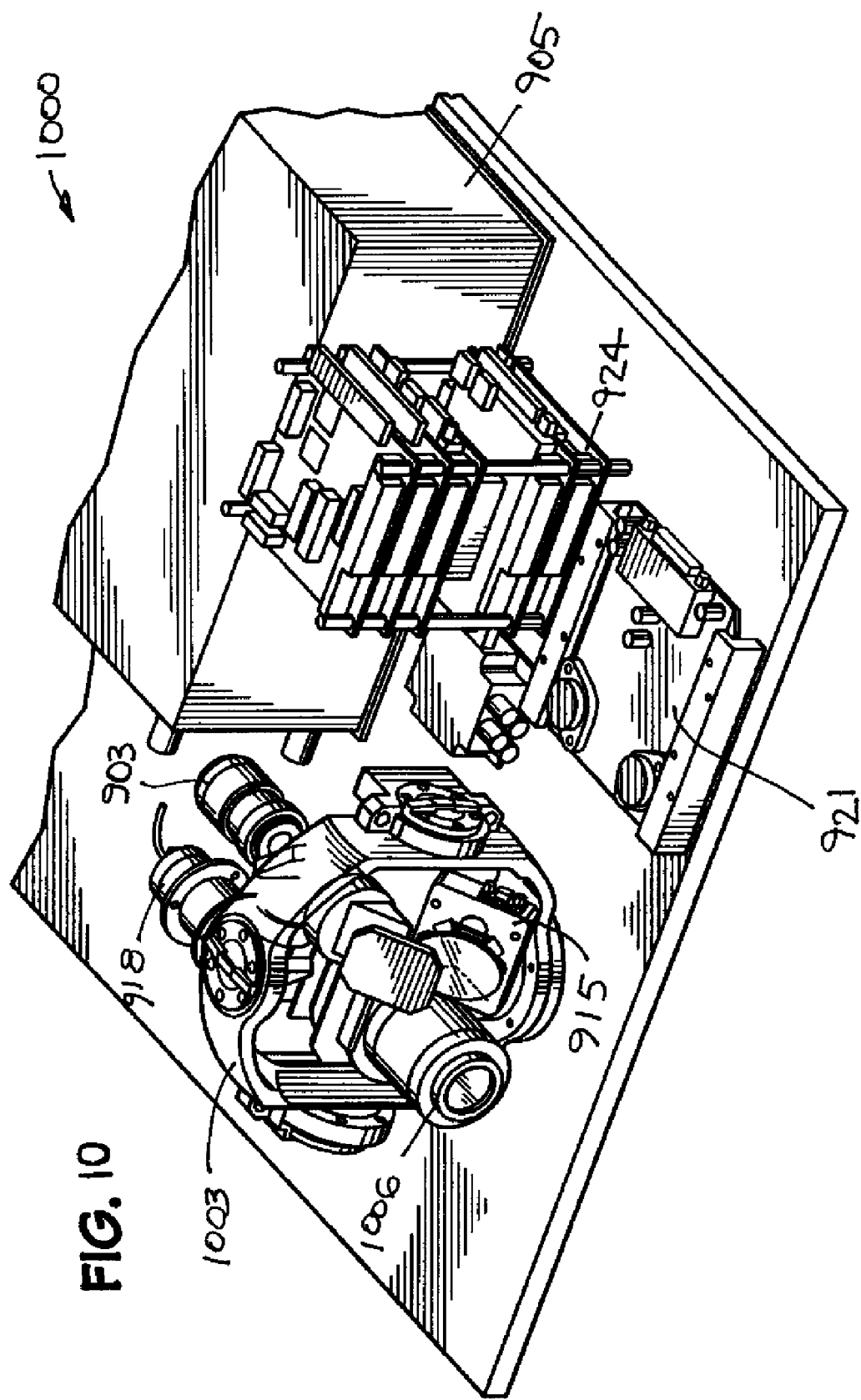
FIG. 10 illustrates a second particular embodiment of the LADAR apparatus of FIG. 1 in which selected elements of the transmit and receive paths are gimbaled.
Figure 11:
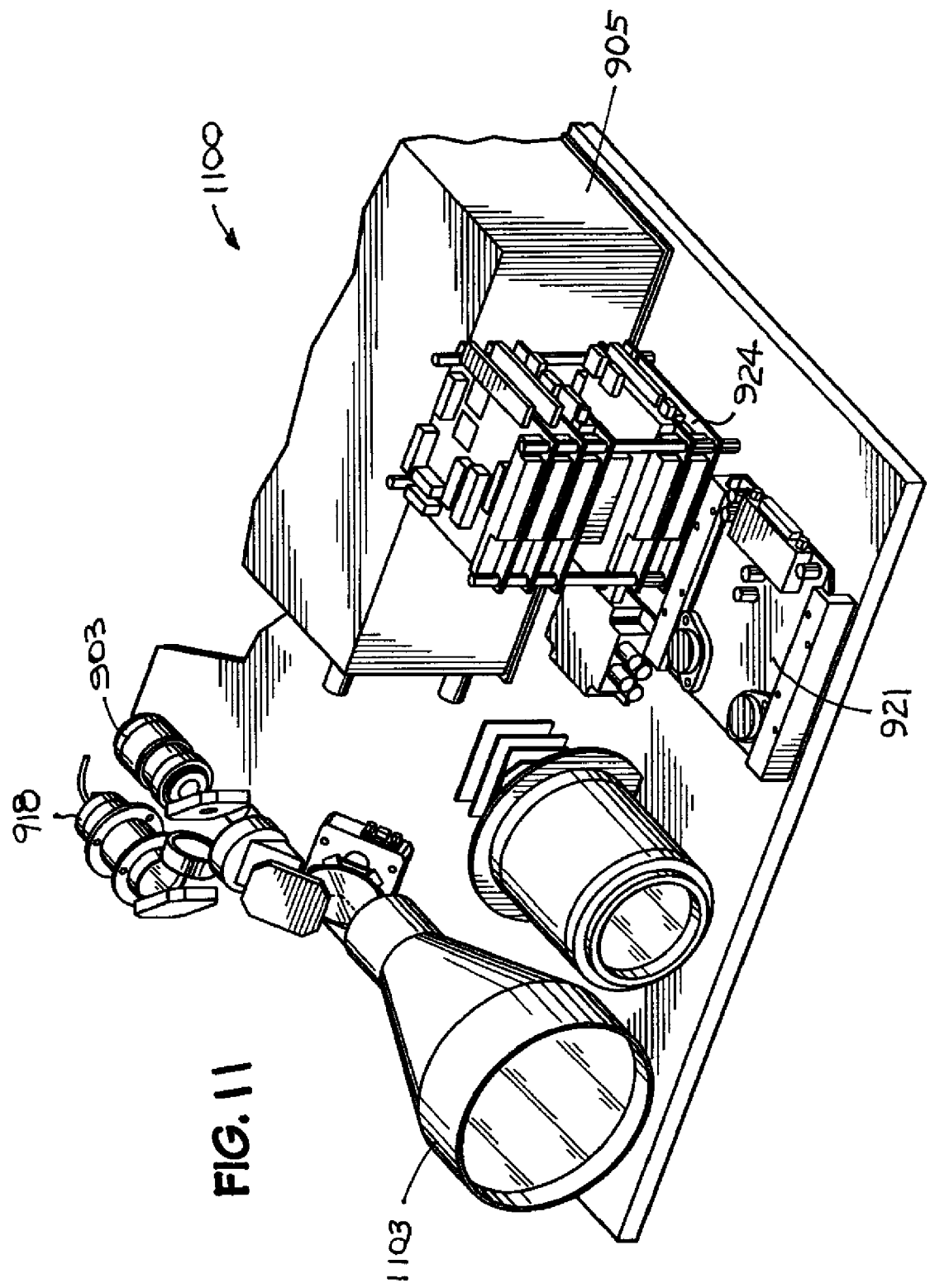
FIG. 11 illustrates a third particular embodiment of the LADAR apparatus of FIG. 1.

To further illustrate the present invention, FIG. 9-FIG. 11 are mechanical drawings of two LADAR apparatuses 900, 1000, and 1100 constructed and operated in accordance with the present invention. The LADAR apparatus 900 in FIG. 9 is one example of a baseline implementation. The LADAR apparatus 1000 in FIG. 10 integrates the optical bench on a gimbal to provide stabilization and pointing capabilities. The LADAR apparatus 1100 adds a telescope to the baseline implementation to provide long range imaging (e.g., >5 km). An uncooled long wave infrared imager ("LWIR") is shown with the LADAR apparatus 1100 in FIG. 11. The addition of the LWIR sensor creates a more robust breadboard for data collection activities.

Turning now to FIG. 9, the LADAR apparatus 900 comprises a transmit path 901 including a fiber laser 903, a laser controller 905 for the fiber laser 903, a beam expander 906, a holed mirror 909, a rotatable Dove prism 912, and a two-axis fine-steering mirror 915. The LADAR apparatus 900 also comprises a receive path 917 including the receive optics 918, a scanner driver 921, a scanner demodulator 924, and the electronics 927 for the various electronic parts. In this embodiment, the mirror 915 is used both in transmitting the LADAR signal 109 and in receiving the reflection 112 and, therefore, constitutes a part of both the transmission and receive paths 901, 917.

In operation, the fiber laser 903 generates a laser beam (not shown) that passes through the beam expander 906. The beam expander 906 expands the diameter of the beam while tightening its divergence. The expanded beam 930 then passes through the holed mirror 909, which divides the expanded beam 930 into a plurality of beamlets 933 that are then rolled by the Dove prism 912 as described above. The rolled beamlets 936 are then scanned by the steering mirror 915 into the field of view as the LADAR signal 109. The reflection 112 is then received through the steering mirror 915 and de-rolled by the Dove prism 912, also as discussed above. The de-rolled reflection 112 is then reflected off the holed mirror 909 and into the receive lens (not shown), which is a part of the receive optics 918. The holed mirror 909 functions as the transmit/receive switch in this particular embodiment. The output beam is small, and goes through the hole. The return beam is large, reflecting off the mirror, although there is some loss through the hole. The de-rolled reflection 933 is then detected by the receive optics 918.

FIG. 10 illustrates a LADAR apparatus 1000 selected elements of the transmit and receive paths (not separately indicated) are mounted on a gimbal 1003, including a receive lens 1006. Gimbaling techniques are well known to the art. See, e.g., U.S. Pat. No. 5,200,606, entitled "Laser Radar Scanning System," issued Apr. 6, 1993, to LTV Missiles and Electronics Group as assignee of the inventors Nicholas J. Krasutsky, et al. Any such suitable technique known to the art may be employed to implement this particular embodiment.

FIG. 11 illustrates a LADAR apparatus 1100 equipped with an optional telescope 1103 to provide long range imaging. Thus, although not required, some embodiments may choose to employ additional optical elements to enhance or augment performance of the present invention. The LADAR apparatus 1100 also includes an uncooled long wave infrared imager 1106, which creates a more robust breadboard for data collection activities.

A LADAR apparatus, a method of use associated therewith, and a method for remotely sensing targets in a field of view are therefore disclosed. In the method, a target in a field of view is remotely sensed using a LADAR signal whose pixel spatial resolution is varied to achieve a desired pixel spatial resolution for the transmitted LADAR signal on the target. One way to do this is by rolling a LADAR signal to achieve the desired pixel spatial resolution at a given range then de-rolling the received reflection. This could involve, for instance, rolling the LADAR signal from a first angle at which it is generated to a second angle at which it is transmitted, and then receiving the reflection at that second angle and de-rolling it to the first angle again for detection. The LADAR apparatus could include a number of means for implementing this functionality. One particular apparatus that is suitable includes a LADAR signal transmitter; a transmission path; a receive path; a receiver; and an optical roll/de-roll mechanism. The optical roll/de-roll mechanism is capable of rolling the LADAR signal before transmission to achieve a desired pixel spatial resolution for the transmitted LADAR signal at a given range and de-rolling the reflection prior to detection.

Thus, the present invention solves, or at least mitigates, the problem of creating a variable pixel spacing in a scanned linear array LADAR system without multiple FOV optics and without complicating subsequent data processing. The present invention inserts an optical rotation mechanism to angle the transmit and receive paths to provide this capability. In addition, the scan rates are slowed down as the rotation angle increases to provide the proper pixel spacing. The present invention therefore uses a single FOV optical system. This provides a wide range of resolutions for the LADAR system that can be used to maintain a set pixel spacing, independent of range, for optimal ATR performance, and/or the ability to have a wide field of view ("WFOV"), a medium field of view ("MFOV"), and narrow field of view ("NFOV") LADAR system similar to current fielded passive imaging devices. The present invention therefore provides the ability to maintain constant pixel spacing in the LADAR image, independent of range, from the LADAR system's minimum range to its maximum range while reducing system cost through elimination of optics with multiple FOVs.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A LADAR apparatus, comprising:
    a LADAR signal transmitter;
    a transmission path through which a LADAR signal may be transmitted from the LADAR signal transmitter;
    a receive path through which a reflection of the transmitted LADAR signal may be received;
    a receiver capable of detecting the reflection received through the receive path; and
    an optical roll/de-roll mechanism positioned in the transmission path and in the receive path that is capable of rolling the LADAR signal before transmission to achieve a desired pixel spatial resolution for the transmitted LADAR signal at a given range and de-rolling the reflection prior to detection.

2. The LADAR apparatus of claim 1, wherein the roll/de-roll mechanism comprises:
    an optical roll element positioned in the transmission path; and
    an optical de-roll element positioned in the receive path.

3. The LADAR apparatus of claim 2, wherein at least one of the optical roll element and the optical de-roll element comprises a dove prism.

4. The LADAR apparatus of claim 1, wherein the roll/de-roll mechanism comprises:
    a dove prism; and
    a transmit/receive switch capable of switching the dove prism between the transmission and receive paths.

5. The LADAR apparatus of claim 1, wherein the LADAR signal transmitter includes:
    a laser for generating the LADAR signal; and
    a laser pump capable of pumping the laser.

6. The LADAR apparatus of claim 5, wherein the laser comprises a fiber laser.

7. The LADAR apparatus of claim 1, wherein the transmission path further comprises at least one of a beam segmenter, a blocking filter, and a transmit/receive switch.

8. The LADAR apparatus of claim 1, wherein the optical de-roll mechanism comprises a dove prism.

9. The LADAR apparatus of claim 1, wherein the de-roll mechanism achieves a desired pixel resolution by matching a pixel instantaneous field of view spacing of the linear array to a desired pixel resolution.

10. The LADAR apparatus of claim 1, wherein the roll/de-roll mechanism comprises at least one scanner in the transmission path between the optical roll/de-roll mechanism and the LADAR signal transmitter and in the receive path between the optical roll/de-roll mechanism and the receiver.

11. The LADAR apparatus of claim 10, wherein the scanner comprises a linear array scanner.

12. The LADAR apparatus of claim 10, wherein the scanner comprises an N×M array scanner, wherein N and M are integers>1.

13. The LADAR apparatus of claim 1, further comprising a telescope through which the LADAR signal may be transmitted.

14. The LADAR apparatus of claim 13, wherein the telescope comprises a portion of the transmission path.

15. The LADAR apparatus of claim 1, further comprising:
a receive channel through which a reflection of the LADAR signal may be received; and
a receiver for detecting the received reflection through the receive channel.

16. The LADAR apparatus of claim 15, wherein the receive channel comprises:
the linear array scanner;
the optical de-roll mechanism; and
a transmit/receive switch capable of switching the linear array and the optical de-roll mechanism between the transmit path and the receiver path.

17. The LADAR apparatus of claim 15, wherein the receiver includes:
a receive lens; and
a linear array of detectors capable of detecting the reflection through the receive lens.

18. The LADAR apparatus of claim 15, wherein the receiver includes a backscatter reference.

19. The LADAR apparatus of claim 15, further comprising a gimbal in which the LADAR signal transmitter, at least a portion of the transmission path, the receiver, and at least a portion of the receiver channel are mounted.

20. The LADAR apparatus of claim 1, further comprising a system controller.

21. The LADAR apparatus of claim 1, further comprising a gimbal in which the LADAR signal transmitter and at least a portion of the transmission path are mounted.

22. A method, comprising:
generating a LADAR signal;
rolling the generated LADAR signal to achieve a desired pixel spatial resolution at a given range;
transmitting the rolled LADAR signal into a field of view;
receiving a reflection of the transmitted LADAR signal; and
de-rolling the received reflection.

23. The method of claim 22, wherein rolling the generated LADAR signal and de-rolling the received reflection include rolling the generated LADAR signal with a first optical roll/de-roll mechanism and de-rolling the received reflection with a second optical roll/de-roll mechanism.

24. The method of claim 22, wherein rolling the generated LADAR signal and de-rolling the received reflection include rolling the generated LADAR signal with a common optical roll/de-roll mechanism.

25. The method of claim 22, wherein generating the LADAR signal includes expanding the beam.

26. The method of claim 25, wherein generating the LADAR signal includes at least one of segmenting the beam, filtering the beam, and switching between a transmit path and a receive path.

27. The method of claim 22, wherein generating the LADAR signal includes at least one of segmenting the beam, filtering the beam, and switching between a transmit path and a receive path.

28. The method of claim 22, wherein the rolling the generated LADAR signal includes matching a pixel instantaneous field of view spacing of the linear array to a desired pixel resolution.

29. The method of claim 22, wherein transmitting the rolled LADAR signal and receiving the reflection include transmitting the LADAR signal and receiving the reflection through a common path.

30. The method of claim 22, wherein transmitting the rolled LADAR signal and receiving the reflection include transmitting the LADAR signal and receiving the reflection through separate paths.

31. An apparatus, comprising:
means for generating a LADAR signal;
means for rolling the generated LADAR signal to achieve a desired pixel spatial resolution at a given range;
means for transmitting the rolled LADAR signal into a field of view;
means for receiving a reflection of the transmitted LADAR signal; and
means for de-rolling the received reflection.

32. The apparatus of claim 31, wherein the rolling means and the de-rolling means include:
a first optical roll/de-roll mechanism; and
a second optical roll/de-roll mechanism.

33. The apparatus of claim 31, wherein the rolling means and the de-rolling means comprise a common optical roll/de-roll mechanism.

34. The apparatus of claim 31, wherein the rolling means achieves a desired pixel resolution by matching a pixel instantaneous field of view spacing of the linear array to a desired pixel resolution.

35. The apparatus of claim 31, wherein the transmitting means and the receiving means comprise a common transmit and receive path.

36. The apparatus of claim 31, wherein transmitting the transmitting means and the receiving means include separate transmit and receive paths.

37. A method, comprising:
transmitting a LADAR signal at a first angle;
rolling the transmitted LADAR signal to a second angle to achieve a desired pixel spatial resolution for the transmitted LADAR signal at a given range;
receiving a reflection of the transmitted LADAR signal at the second angle; and
de-rolling the reflection to the first angle prior to detection.

38. The method of claim 37, wherein the first angle is the horizontal angle.

39. The method of claim 37, wherein rolling the transmitted LADAR signal includes optically rolling the transmitted LADAR signal.

40. The method of claim 37, wherein rolling the transmitted LADAR signal includes electronically rolling the transmitted LADAR signal.

41. The method of claim 37, wherein de-rolling the reflection includes optically de-rolling the reflection.

42. The method of claim 37, wherein de-rolling the reflection includes electronically de-rolling the reflection.

43. An apparatus, comprising:
means for transmitting a LADAR signal at a first angle;
means for rolling the transmitted LADAR signal to a second angle to achieve a desired pixel spatial resolution for the transmitted LADAR signal at a given range;
means for receiving a reflection of the transmitted LADAR signal at the second angle; and
means for de-rolling the reflection to the first angle prior to detection.

44. The apparatus of claim 43, wherein the first angle is the horizontal angle.

45. The apparatus of claim 43, wherein the rolling means includes means for optically rolling the transmitted LADAR signal.

46. The apparatus of claim 43, wherein the rolling means includes means for electronically rolling the transmitted LADAR signal.

47. The apparatus of claim 43, wherein the de-rolling means includes means for optically de-rolling the reflection.

48. The apparatus of claim 43, wherein the de-rolling means includes means for electronically de-rolling the reflection.

49. A method comprising:
remotely sensing a target in a field of view using a LADAR signal; and
varying the pixel spatial resolution of the LADAR signal to achieve a desired pixel spatial resolution for the transmitted LADAR signal on the target.

50. The method of claim 49, wherein remotely sensing the target includes transmitting a pulsed, split beam LADAR signal.

51. The method of claim 49, wherein remotely sensing the target includes scanning the LADAR signal into the field of view.

52. The method of claim 49, wherein remotely sensing the target in the field of view includes telescoping the LADAR signal to a farther field of view.

53. The method of claim 49, wherein varying the pixel spatial resolution includes:
rolling the LADAR signal from a first angle at which it is generated to a second angle at which it is transmitted to achieve the desired pixel spatial resolution; and
de-rolling a received reflection of the transmitted LADAR signal to the first angle prior to detection.

54. The method of claim 49, wherein varying the pixel spatial resolution includes varying the pixel spatial resolution responsive to a change in the field of view.

55. The method of claim 49, further comprising imaging infrared radiation from the field of view.

56. An apparatus comprising:
means for remotely sensing a target in a field of view using a LADAR signal; and
means for varying the pixel spatial resolution of the LADAR signal to achieve a desired pixel spatial resolution for the transmitted LADAR signal on the target.

57. The apparatus of claim 56, wherein the remotely sensing means includes means for transmitting a pulsed, split beam LADAR signal.

58. The apparatus of claim 56, wherein the remotely sensing means includes means for scanning the LADAR signal into the field of view.

59. The apparatus of claim 56, wherein the remotely sensing means includes means for telescoping the LADAR signal to a farther field of view.

60. The apparatus of claim 56, wherein the varying means includes:
means for rolling the LADAR signal from a first angle at which it is generated to a second angle at which it is transmitted to achieve the desired pixel spatial resolution; and
means for de-rolling a received reflection of the transmitted LADAR signal to the first angle prior to detection.

61. The apparatus of claim 56, wherein the varying means includes means for varying the pixel spatial resolution responsive to a change in the field of view.

62. The apparatus of claim 56, further comprising means for imaging infrared radiation from the field of view.

\* \* \* \* \*